March 7, 1944.　　H. M. LEONARD　　2,343,778
DIRECTION INDICATOR
Filed May 27, 1941　　2 Sheets-Sheet 1

INVENTOR
Henry M. Leonard
BY
ATTORNEYS

March 7, 1944. H. M. LEONARD 2,343,778
DIRECTION INDICATOR
Filed May 27, 1941 2 Sheets-Sheet 2

INVENTOR
Henry M. Leonard

Patented Mar. 7, 1944

2,343,778

UNITED STATES PATENT OFFICE 2,343,778

DIRECTION INDICATOR

Henry M. Leonard, Brooklyn, N. Y.

Application May 27, 1941, Serial No. 395,331

2 Claims. (Cl. 200—59)

This invention relates to signal devices, and more particularly to directional signal devices adapted for use in vehicles to indicate to other operators changes or contemplated changes in direction of travel.

An object of this invention is to provide a device of the general character described, which will be operative under all circumstances and which will enable the driver of the vehicle to automatically signal changes in direction.

A further object is to provide a device of the general character described, which will allow the manipulation of the wheel through its complete range without throwing the signal out of kilter and in which the signal will function throughout the range.

Still another object is to provide a direction indicating signal which will not be affected by minor movements of the wheel necessary in ordinary driving where no real change of direction is made.

A further object is to provide an indicator which will enable the operator to know whether his direction signals are in use or not in operation and will thus avoid the possibility of the operator leaving the signal on when no change of direction is contemplated.

Another object is to provide a device which is readily adaptable to the conventional automobile steering post and which may be simply and readily applied without major changes to the construction.

In the accompanying drawings—

It will be appreciated that while I have shown my device adapted to a signal which is provided with arrows indicating right and left turns, the operating mechanism would be equally applicable to mechanically operated arrows or other indicating devices.

It will also be appreciated that the indicator might be placed at any convenient spot on the vehicle, such as at the rear or adjacent the door, on top of the vehicle, or elsewhere.

Figure 1:
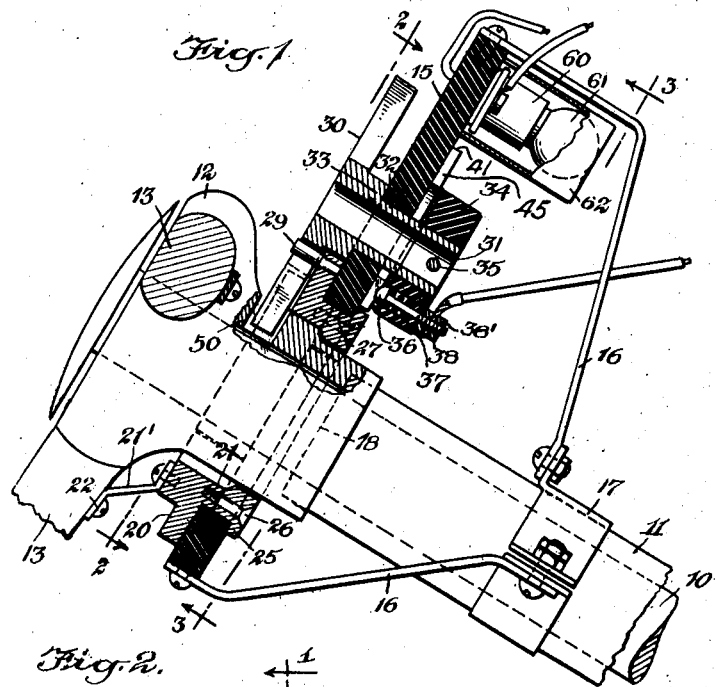
Fig. 1 is a cross-sectional elevation, taken on the line 1—1 of Fig. 2, showing a device embodying my invention applied to the conventional steering post.
Figure 2:
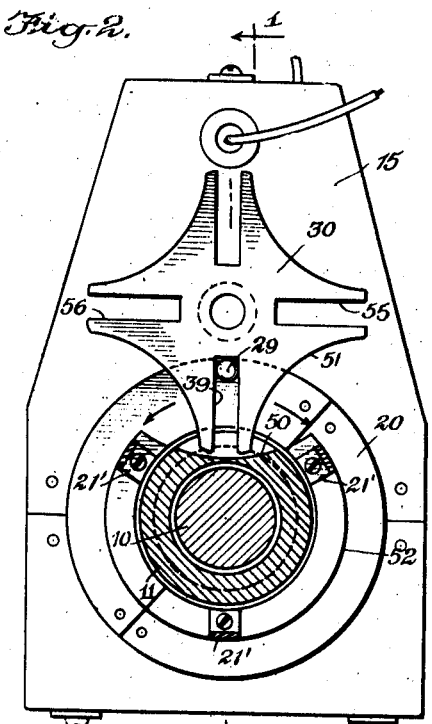
Fig. 2 is a cross-sectional view taken on the line 2—2 of Fig. 1.
Figure 3:
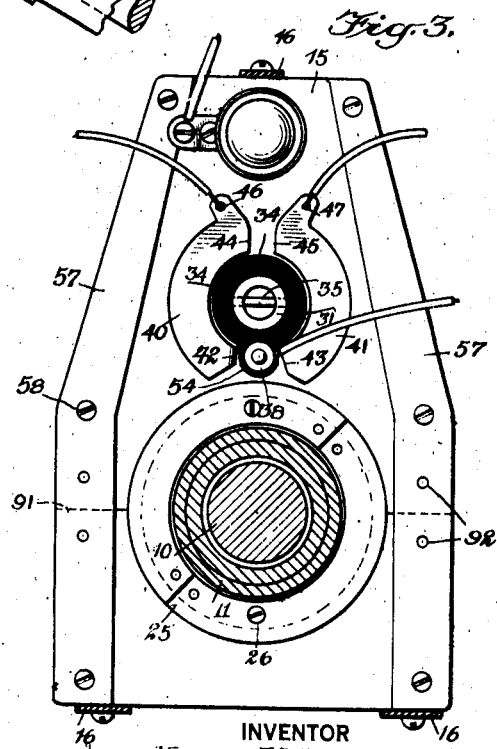
Fig. 3 is a cross-sectional view taken on the line 3—3 of Fig. 1.

Referring again to Fig. 1, 10 represents the conventional steering post and 11 the housing covering this post, while 12 indicates the steering wheel and 13 the spokes thereof.

I provide a base or mounting 15 which is positioned with relation to the steering post by means of the supports 16 and the bracket 17 and which is adapted to surround the hub 18 of the wheel 12. A disk member 20 likewise surrounds the hub 18 and has a depending shoulder 21 adapted to extend partly through the base or mounting 15. The disk 20 is fixed with relation to the wheel 12 by means of the brackets 21' fixed by screws 22 to the spokes of the wheel or otherwise, so that the disk 20 will rotate with the wheel. A ring 25 likewise surrounds the hub 18 and is fixed to the disk 20 by means of the screws 26 or by other suitable means. The ring 25 is slightly larger than the opening 27 in the base 15 so as to position itself and the disk 20 with relation to said base.

Positioned in the mounting of the base 15 is a geneva 30 having a hub 31 extending through an opening 32 in the base 15. The hub 31 is provided with shoulders 33 to position the geneva away from the base 15 and to assure clearance.

Mounted in the lower end of the hub 31 is an insulated packing or washer 34 held in place by a pin 35 extending therethrough and through the hub 31. The packing 34 carries a contact point 36 positioned therein which may be provided with a spring 37 to force it inwardly toward the base. The contact point 36 extends through the packing 34 and has a threaded end 38 adapted to receive nuts 38'.

Mounted on the bottom of the base 15 are two arc-shaped contact members 40 and 41 having their ends 42 and 43, 44 and 45 spaced apart and adapted to be engaged by the contact 36. Adjacent the ends 44 and 45 are openings 46 and 47 adapted to engage lead-in wires.

Mounted in the disk 20 is a pin 29 adapted to engage slots 39, 55 and 56 in the geneva 30. While I have shown an arc-shaped portion 50 cut out of the wheel hub allowing the ends of the geneva to pass therethrough, this is not necessary, and by making the geneva and the disk 20 smaller equal compactness may be secured.

It will be seen that when the wheel is turned slightly the contact 36 mounted in the end 54 of the packing 34 has some play and must move some distance before engaging the end 42 or 43 of the contact arc 40 or 41. Hence a signal will not be given in response to the movement of the wheel 12 where no real change of direction in travel is made. However, as the wheel is moved farther, as in a turn, the contact 36 will engage one of the contact arcs and the pin 29 will slide out of the slot 39 of the geneva as the arc 51 engages the periphery of the rim 52 locking the contact in position. As the wheel is continuously turned and completes almost a full turn, the pin 29 will engage the next slot 55 of the geneva and turn the geneva another quarter turn moving the contact 36 on the contact member 40 or 41, as the case may be, 90 degrees. Since another complete turn of the wheel may be made before the contact 36 is again moved, it will be seen that two complete turns of the wheel may be made while the contact point 36 moves approximately through only 135 degrees of a revolution in engagement with the member 40 or 41.

While the operation described involves the turning of the wheel in a counter-clockwise direction, it will be appreciated that the same is true of a clockwise turning, when the slot 56 will be engaged after one full turn of the wheel.

It will be appreciated that the packing 34 will be of insulating material and that the base 15 will likewise be made of insulating material. The base may of course be supported by metal side members 57 fastened thereto by the screws 58 or by any other suitable means. Mounted on the base 15 a small light socket 60 is adapted to hold the bulb 61 and it may be surrounded by a translucent casing 62 to give a dim light. As will hereinafter be explained, this bulb 61 is located in series with the contacts and will light whenever the contact 36 engages either of the arc contacts 40 and 41.

Figure 4:
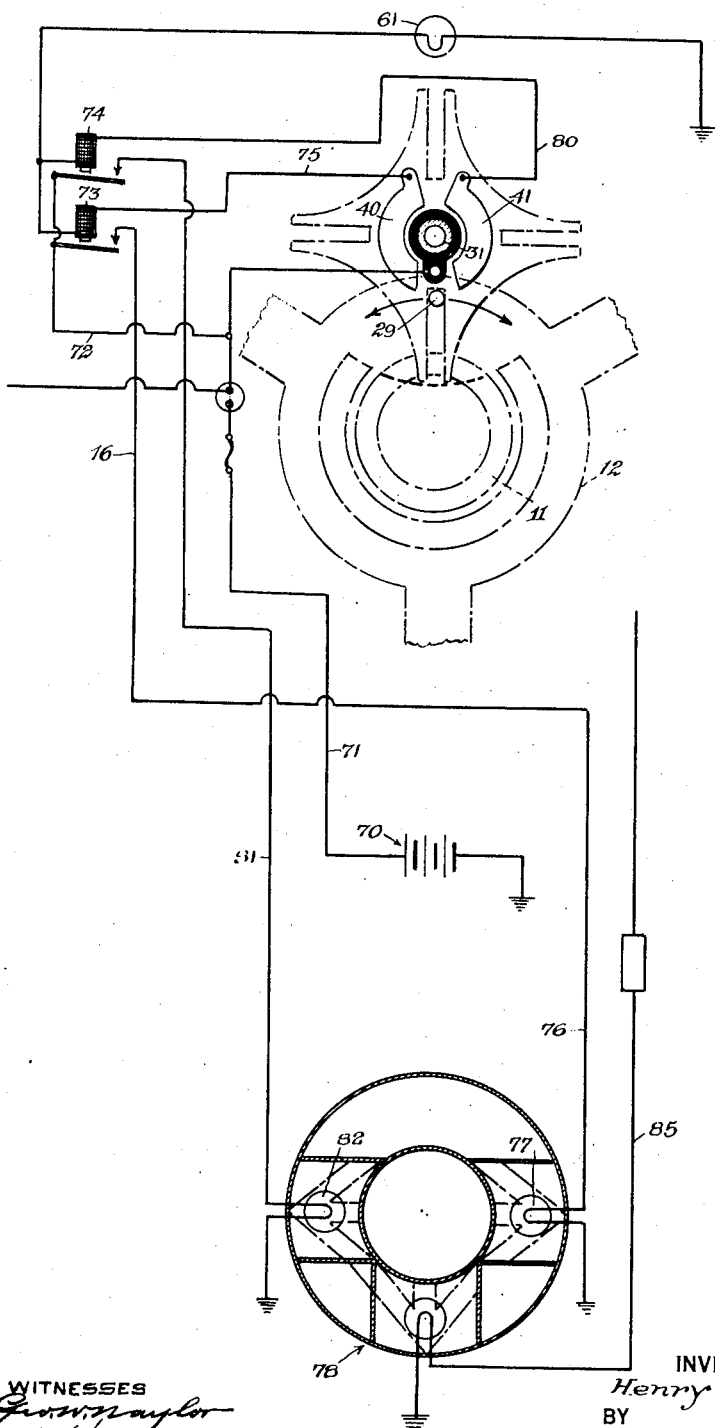
Fig. 4 is a diagrammatic view showing the wiring and operation of the signal.

As has been previously brought out, while I have disclosed my device adapted for use in connection with a signal embodying the use of arrows and lights, it is adaptable for use with any type of signal. However, for the purpose of illustration reference is had to Fig. 4, in which a diagrammatic view of the wiring is presented.

From a battery or other source of power 70 a wire 71 runs to the contact pin 36. A connection 72 runs from the wire 71 to the relays 73 and 74. A wire 75 extends from the contact arc 40 to the relay 73 from which a wire 76 runs to a light source 77 in the signal 78. Similarly, a wire 80 runs from the contact arc 41 to the relay 74, while a wire 81 runs from the relay 74 to the light 82. It will be seen therefore that when the contact pin 36 is brought into contact with the arc 40 current will flow from the battery through the contacts to energize the relay 73, through the wire 76 to the light 77. When the wheel is turned counter-clockwise, the contact pin will engage the contact 41 and the current will flow from the battery 70 through the contacts through the wire 80 to energize the relay 74 and through the wire 81 to the light 82. A wire 85 connects the stoplight to the conventional brake foot pedal (not shown).

The bulb 61 is connected in series in the wire 84 so that it will light whenever any of the signal lights are on.

For the purpose of convenience in installation, the base 15 would be in two portions separating along the line 91 and held together by the dowels 92 and the metal side members 57. Similarly, the disk member 20 and the ring member 25 may be made in segments and fastened together with dowels and screws.

I claim:

1. In combination with a steering wheel and housing therefor, a device for controlling a direction signal indicator comprising a disk mounted on the hub of said steering wheel and fixed with relation thereto, a base mounted on said steering wheel housing, a geneva mounted in said base, a pin on said disk engaging said geneva, arcuate contacts on said base, and a contact mounted on said geneva adapted to engage one of said arcuate contacts when said wheel is rotated in one direction and to engage the other one of said contacts when the wheel is rotated in the other direction.

2. The combination with steering means of a vehicle including a steering wheel and the stationary column-housing, of a device for operating a travel direction indicator, said device comprising a base fixed on said housing, spaced arcuate contacts positioned on said base in spaced relation to each other, a rotatable geneva mounted on said base and having a hub extending through said base, a contact member carried by said hub and insulated therefrom so as to move with said geneva and normally spaced from said arcuate contacts to provide lost motion, and means carried by said wheel which acts on said geneva to cause said contact member to engage one of said arcuate contacts and to remain in engagement therewith when said wheel is rotated in one direction as much as two complete revolutions and to engage the other one of said contacts and to remain in engagement therewith when the wheel is rotated in the other direction as much as two complete revolutions.

HENRY M. LEONARD.